US012586956B2

(12) United States Patent
Yang

(10) Patent No.: US 12,586,956 B2
(45) Date of Patent: Mar. 24, 2026

(54) MINIATURIZED ELECTRICAL CONNECTOR WITH FEATURES TO PREVENT SHORT CIRCUIT OF POWER TERMINALS

(71) Applicant: HIROSE KOREA CO., LTD., Siheung-si (KR)

(72) Inventor: Kang Gun Yang, Siheung-si (KR)

(73) Assignee: HIROSE KOREA CO., LTD., Siheung-si (KR)

( * ) Notice: Subject to any disclaimer, the term of this patent is extended or adjusted under 35 U.S.C. 154(b) by 278 days.

(21) Appl. No.: 18/372,422

(22) Filed: Sep. 25, 2023

(65) Prior Publication Data

US 2024/0106168 A1 Mar. 28, 2024

(30) Foreign Application Priority Data

Sep. 27, 2022 (KR) ........................ 10-2022-0122805

(51) Int. Cl.

| | |
|---|---|
| ***H01R 13/64*** | (2006.01) |
| ***H01R 12/70*** | (2011.01) |
| ***H01R 13/50*** | (2006.01) |
| *H01R 12/71* | (2011.01) |
| *H01R 12/73* | (2011.01) |
| *H01R 13/20* | (2006.01) |

(52) U.S. Cl.
CPC ......... *H01R 13/64* (2013.01); *H01R 12/7088* (2013.01); *H01R 13/50* (2013.01); *H01R 12/70* (2013.01); *H01R 12/71* (2013.01); *H01R 12/712* (2013.01); *H01R 12/714* (2013.01); *H01R 12/716* (2013.01); *H01R 12/73* (2013.01); *H01R 13/20* (2013.01)

(58) Field of Classification Search
CPC .... H01R 13/64; H01R 12/7088; H01R 13/50; H01R 12/70; H01R 12/71; H01R 12/712; H01R 12/714; H01R 12/716; H01R 12/73; H01R 13/20
See application file for complete search history.

(56) References Cited

U.S. PATENT DOCUMENTS

2016/0064843 A1* 3/2016 Hasegawa ............ H01R 12/716 439/65
2022/0085540 A1* 3/2022 Sugaya .................. H01R 12/73

* cited by examiner

*Primary Examiner* — Justin M Kratt
(74) *Attorney, Agent, or Firm* — Maschoff Brennan

(57) ABSTRACT

Disclosed herein is a pair of electrical connectors including a plug connector and a receptacle connector. The plug connector includes a plug housing, a plug signal terminal, a plug power terminal, and a fastening wall. The receptacle connector includes a receptacle housing, a receptacle signal terminal, a receptacle power terminal, and a fastening groove. With the plug connector completely fitted into the receptacle connector, the fastening wall is placed on the fastening groove.

6 Claims, 9 Drawing Sheets

MINIATURIZED ELECTRICAL CONNECTOR WITH FEATURES TO PREVENT SHORT CIRCUIT OF POWER TERMINALS

TECHNICAL FIELD

The present invention relates to an electrical connector. More particularly, the present invention relates to a connection structure between a plug connector and a receptacle connector.

BACKGROUND

Generally, interconnection between substrates is established using two connectors that are connected to respective substrates by soldering or the like and are connectable to each other. Here, one of the two connectors is a plug connector and the other is a socket connector. The socket connector is also referred to as a receptacle connector. Such plug and socket connectors may be formed by disposing terminals in a molded part. The plug connector and the socket connector may be fastened to each other to form an electrical connector assembly.

With the trend toward miniaturization of electronic devices, connectors have increasingly become compact in size and height. However, there are certain limitations in making a connector compact in size and height by reducing a pitch between electrical terminals or by downsizing related components.

Miniaturization of connectors makes it more difficult than before to ensure durability thereof. Such connectors are more prone to breakage or deformation under a smaller force due to reduced rigidity thereof.

In addition, miniaturization of connectors can increase the probability of misassembly. In the case of large connectors, fitting between a pair of connectors requires relatively great force, making it difficult to fit the connectors into each other in the wrong direction, whereas, in the case of tiny connectors, fitting between a pair of connectors requires little force, making possible fitting in the wrong direction (reverse mating), regardless of the shape of the pair of connectors.

In addition, two mating connectors can undergo plastic deformation if metal terminals thereof continue to retain a certain shape during or after the process of connecting the connectors to each other. Plastic deformation is the opposite of elastic deformation and refers to irreversible deformation or changes in shape of a material retained after removal of applied load. Even with elasticity, most materials usually undergo deformation when exposed to stress. Therefore, there is a need for a solution to prevent plastic deformation that can occur in connector terminals, which are becoming increasingly reduced in size.

A resin-molded part (housing) of a connector is often manufactured by insert molding. Here, fluidity of a resin used is critical to proper molding of the housing. Therefore, there is a need to improve fluidity of the resin.

In addition, in manufacture of metal terminals, the structures of the terminals and the resin-molded part are limited depending on the manufacturing method thereof (for example, whether deep drawing is used). Therefore, there is a need to consider these points.

Further, during an insert molding process or the like, an injected resin can cover a metal material. Therefore, there is a need to consider this problem.

SUMMARY

It is one aspect of the present invention to provide a solution to prevent misassembly (reverse mating) between a pair of connectors due to reduction in size of the connectors.

In the case of large connectors, fitting between a pair of connectors requires relatively great force, making it difficult to fit the connectors into each other in the wrong direction, whereas, in the case of tiny connectors, fitting between a pair of connectors requires little force, making possible fitting in the wrong direction (reverse mating), regardless of the shape of the pair of connectors. It is one aspect of the present invention to solve this problem.

The above and other aspects of the present invention will become apparent to those skilled in the art from the detailed description of the following embodiments in conjunction with the accompanying drawings.

In accordance with one aspect of the present invention, there is provided a pair of electrical connectors including a plug connector and a receptacle connector, wherein the plug connector includes: (a) a plug housing including a plug base and a wall protruding upwards from the plug base; (b) a plug signal terminal disposed on the wall; (c) a plug power terminal disposed on the wall; and (d) a fastening wall formed on the wall between the plug signal terminal and the plug power terminal, the receptacle connector includes: (e) a receptacle housing including a receptacle base, a first wall protruding from an upper surface of the receptacle base, a second wall protruding from the upper surface of the receptacle base and crossing the first wall, a third wall protruding from the upper surface of the receptacle base, crossing the second wall, and facing the first wall, and a fourth wall protruding from the upper surface of the receptacle base, crossing the first and third walls, and facing the second wall; (f) a receptacle signal terminal disposed at least on the second wall; (g) a receptacle power terminal disposed at least on the first wall; and (h) a fastening groove formed between the second wall and the fourth wall, and the fastening wall is placed on the fastening groove with the plug connector completely fitted into the receptacle connector.

The fastening wall may be formed on the wall of the plug connector and may have a greater width than the wall.

The plug connector may further include: a connection wall between the fastening wall and the wall of the plug connector, wherein the connection wall may be smaller in height and width than the wall of the plug connector.

The plug connector may have a through-hole formed through the plug housing at both sides of the connection wall.

The receptacle connector may further include: an inner protruding wall between the second wall and the fourth wall, wherein the inner protruding wall protrudes upwards from the receptacle base and extends toward inner surfaces of the second wall and the fourth wall in a transverse direction of the receptacle connector.

The inner protruding wall may be formed at an upper portion thereof with an upward protrusion extending higher than the wall of the receptacle housing.

The upward protrusion may be placed in the through-hole with the plug connector completely fitted into the receptacle connector.

A space above the inner protruding wall may form an open hole and the connection wall may be placed in the open hole with the plug connector completely fitted into the receptacle connector.

According to the present invention, it is possible to prevent reverse mating (fitting in the reverse direction) while significantly reducing the overall height and width of the connectors (10, 20).

Due to the connection structure between the connection wall (10-5-CW) and the open hole (20-5-D), the connection structure between the fastening wall (10-5-MW) and the fastening groove (20-5-MD), and the connection structure between the upward protrusion (20-5-P2) and the through-hole (10-5-PH), fitting in the reverse direction (that is, fitting between the connectors (10, 20) with one of the connectors 10, 20 reversed in position in the longitudinal direction thereof) can be prevented. Consequently, it is possible to prevent reverse mating while providing space savings due to reduction in height of the connectors (10, 20).

If each of the signal terminals (10-3, 20-3) (that is, each pin) has a different role, reverse mating means occurrence of unwanted short-circuit. The same is true for the power terminals (10-1, 20-1). That is, reverse mating can result in unwanted false signal input or unwanted short-circuit depending on the role of each pin. In addition, reverse mating can cause damage to the connector, although, in the case of a connector having a completely symmetrical shape, reverse mating does not cause physical damage to the connector. According to the present invention, reverse mating between the connectors (10, 20) is fundamentally prevented.

Specifically, the plug connector (10) has a fastening wall (10-5-MW) extending beyond both lateral ends of the wall of the plug connector, and the receptacle connector (20) has an upward protrusion (20-5-P2) extending beyond the upper end of the wall of the receptacle connector. The fastening wall (10-5-MW) and the upward protrusion (20-5-P2) are formed of a resin. Accordingly, upon reverse mating as shown in FIG. 8A or FIG. 9A, the upward protrusion (20-5-P2) and the fastening wall (10-5-MW), which are formed of a resin, are first brought into contact with the connectors (10, 20), respectively, to prevent two power terminals (10-1) of the connector (10) from being simultaneously brought into contact with two power terminals (20-1) of the connector (20), thereby preventing short-circuit.

The above and other advantageous effects of the present invention will become apparent to those skilled in the art from the detailed description of the following embodiments in conjunction with the accompanying drawings.

BRIEF DESCRIPTION OF THE DRAWINGS

The above and other aspects, features, and advantages of the present invention will become apparent from the detailed description of the following embodiments in conjunction with the accompanying drawings.

DETAILED DESCRIPTION OF EMBODIMENTS

Figure 1:
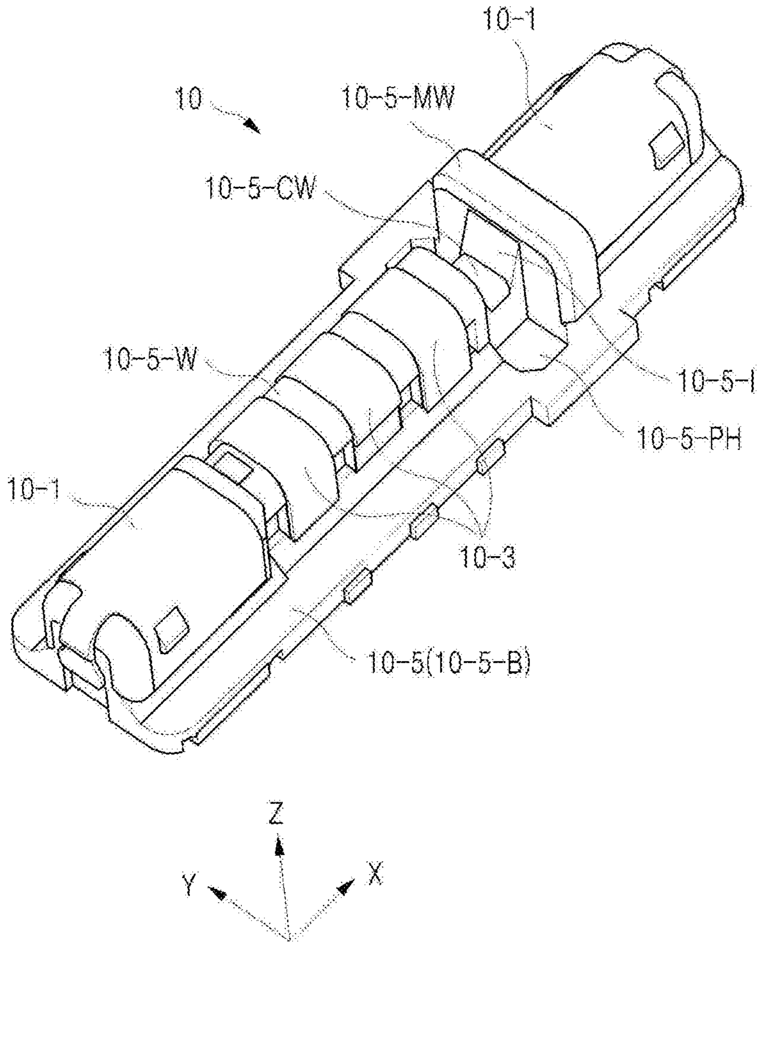
FIG. 1 is a view of a plug connector 10 among electrical connectors according to the present invention.

Hereinafter, exemplary embodiments of the present invention will be described with reference to the accompanying drawings. It should be understood that the present invention is not limited to the following embodiments and may be embodied in different ways, and that the embodiments are provided for complete disclosure and thorough understanding of the present invention by those skilled in the art. The scope of the present invention is defined only by the claims. Like components will be denoted by like reference numerals throughout the specification.

FIG. 1 is a view of a plug connector 10 among electrical connectors according to the present invention.

Herein, “electrical connector” may refer to a plug connector 10, a receptacle connector 20 (also referred to as a “socket connector”), or both the plug connector 10 and the receptacle connector 20 (or an assembly thereof), as the context indicates.

FIG. 1 shows, by way of example, a power terminal 10-1, a signal terminal 10-3, and a housing 10-5 (a molded part) of the plug connector 10.

The power terminal 10-1 is a metal structure for reinforcement of the connector 10 and allows input/output of electrical signals. The signal terminal 10-3 allows input/output of data signals.

However, it should be understood that this structure is provided by way of example and the present invention is not limited thereto. For example, the power terminal 10-1 may be formed with a fitting and a power terminal separate from each other.

For example, the signal terminal 10-3 may include four pins capable of carrying a current of 0.3 A, or may be a terminal capable of carrying a current of greater than 0.3 A, for example, a current of up to 5 A, to function as a power terminal. Although the signal terminal is described as including four pins, this is merely an example. For reference, three signal terminals 10-3 are shown in FIG. 1.

The housing 10-5 has a base 10-5-B. The housing 10-5 has a wall protruding from an upper surface of the base and adapted for the power terminal 10-1, the signal terminal 10-3, and the like to be formed thereon.

Although the wall may include four walls connected in a rectangular shape, one wall 10-5-W is shown in FIG. 1.

The housing 10-5 (a molded part) of the plug connector 10 may be formed of a plastic material, for example, a liquid crystal polymer (LCP). Alternatively, the housing 10-5 may be formed of an insulator, such as a resin and an epoxy, without being limited thereto. The power terminal 10-1 and the signal terminal 10-3 of the plug connector 10 may be formed of a metal, for example, copper or a copper alloy plated with gold (a nickel underlayer), without being limited thereto.

Referring to FIG. 1, a connection wall 10-5-CW is formed between a power terminal 10-1 on the left side of the drawing and three signal terminals 10-3. The connection wall 10-5-CW is a portion of the housing 10-5.

The connection wall 10-5-CW may also be considered to be a portion of the wall 10-5-W. The connection wall 10-5-CW may also be considered to be formed between two separate portions of the wall 10-5-W. That is, the connection wall 10-5-CW is formed on the wall 10-5-W of the plug connector 10 and is smaller in width and height than the wall 10-5-W, as shown in FIG. 1.

A slope (an inclined portion) 10-5-I is formed between the connection wall 10-5-CW and the wall 10-5-W (and between the connection wall 10-5-CW and a fastening wall 10-5-MW).

As will be described below, an inner protruding wall 20-5-P1 of a mating connector, that is, a socket connector 20 (put differently, an open hole 20-5-D around the inner protruding wall 20-5-P1) is placed in a space provided by the connection wall 10-5-CW, which is smaller in width and height than the wall 10-5-W therearound.

Referring to FIG. 1, a fastening wall 10-5-MW is formed between the connection wall 10-5-CW and a power terminal 10-1 on the right side of the drawing. The fastening wall 10-5-MW has a greater width than the wall 10-5-W. As shown in FIG. 1, the fastening wall 10-5-MW is flush (or substantially flush) with the power terminal 10-1 and extends beyond both lateral ends of the wall 10-5-W in a transverse direction thereof (the Y-axis direction).

Two through-holes 10-5-PH are formed at opposite sides of the connection wall 10-5-CW, respectively. That is, the housing 10-5 has two through-holes formed therethrough. As will be described below with reference to FIG. 5 to FIG. 7, an upward protrusion 20-5-P2 of the mating connector 20 is exposed through the through-hole 10-5-PH.

Although the housing 10-5 is shown as having both the connection wall 10-5-CW and the fastening wall 10-5-MW in FIG. 1, the present invention is not limited thereto. For example, the housing 10-5 may have only the fastening wall 10-5-MW without the connection wall 10-5-CW.

Figure 2:
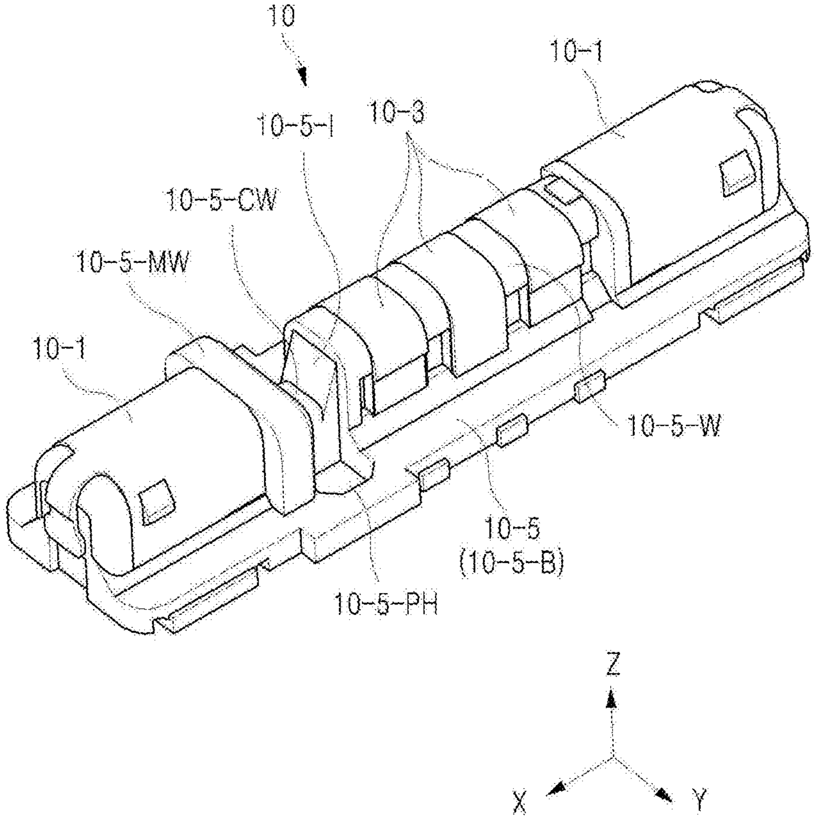
FIG. 2 is a view of the plug connector 10 of FIG. 1 from a different angle.

FIG. 2 is a view of the plug connector 10 of FIG. 1 from a different angle.

Like FIG. 1, FIG. 2 shows a power terminal 10-1, a signal terminal 10-3, and a housing 10-5.

The housing 10-5 has a base 10-5-B, a wall 10-5-W, a connection wall 10-5-CW, and an inclined portion 10-5-I.

The inclined portion 10-5-I includes two inclined portions 10-5-I formed between the wall 10-5-W and the connection wall 10-5-CW (see the left side of FIG. 2) and between the fastening wall 10-5-MW and the connection wall 10-5-CW (see the right side of FIG. 1), respectively.

As will be described below, an inner protruding wall 20-5-P1 of a mating connector, that is, a socket connector 20 (put differently, an open hole 20-5-D around the inner protruding wall 20-5-P1) is placed in a space provided by the connection wall 10-5-C, which is smaller in width and height than the wall 10-5-W therearound.

Since the plug connector 10 has an asymmetrical shape in the longitudinal direction thereof (that is., the connection wall 10-5-CW is formed only on one side in the longitudinal direction of the plug connector 10 (the X-axis direction)), it is possible to easily know a direction in which the plug connector 10 is connected to the mating connector 20 and to instantly recognize misassembly (incorrect fitting), thereby preventing reverse mating.

Figure 3:
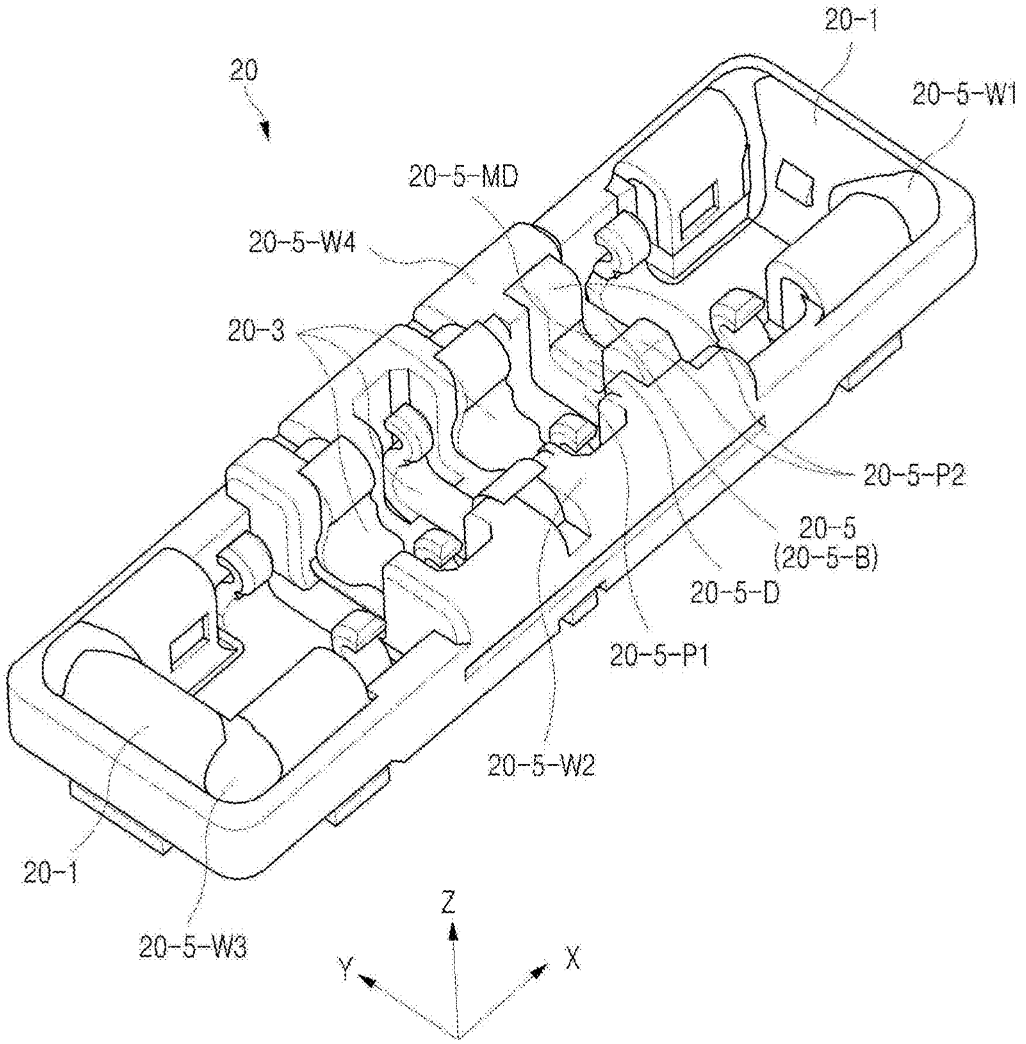
FIG. 3 is a view of a socket connector 20 among electrical connectors according to the present invention.

FIG. 3 is a view of a socket connector 20 among electrical connectors according to the present invention.

The socket connector 20 is also referred to as a receptacle connector 20.

The socket connector 20 of FIG. 3 and the plug connector 10 of FIG. 1 are configured to be fitted into each other. It will be understood that orientations (especially, vertical orientations) of FIG. 1 and FIG. 3 are for convenience of description of the structure of the connectors 10, 20 and the plug connector 10 and the socket connector 20 cannot be fitted into each other without changing the position (see FIG. 1 or FIG. 3) of one of the connectors 10, 20. That is, the plug connector 10 of FIG. 1 needs to be turned upside down (such that the Z-axis direction is upside down) so as to be fitted into the socket connector 20 of FIG. 3, and the socket connector 20 of FIG. 3 needs to be turned upside down (such that the Z-axis direction is upside down) so as to be fitted into the plug connector 10 of FIG. 1.

FIG. 3 shows, by way of example, a power terminal 20-1, a signal terminal 20-3, and a housing 20-5 (a molded part) of the socket connector 20.

The power terminal 20-1 is a metal structure for reinforcement of the connector 20 and allows input/output of electrical signals. The signal terminal 20-3 allows input/output of data signals.

However, this is merely an example and the present invention is not limited thereto. For example, the power terminal 20-1 may be formed with a fitting and a power terminal separate from each other.

For example, the signal terminal 20-3 may include four pins capable of carrying a current of 0.3 A, or may be a terminal capable of carrying a current of greater than 0.3 A, for example, a current of up to 5 A, to function as a power terminal. Although the signal terminal is described as including four pins, this is merely an example. For reference, three signal terminals 10-3 are shown in FIG. 3.

The housing 20-5 has a base 20-5-B. The housing 20-5 has a wall protruding from an upper surface of the base and adapted for the power terminal 20-1, the signal terminal 20-3, and the like to be formed thereon.

The wall generally includes four walls, that is, a first wall 20-5-W1, a second wall 20-5-W2, a third wall 20-5-W3, and a fourth wall 20-5-W4. As shown in FIG. 3, the four walls are connected to one another in a sequence of the first wall 20-5-W 1/the second wall 20-5-W2/the third wall 20-5-W3/the fourth wall 20-5-W4 and the fourth wall 20-5-W4 is in turn connected to the first wall 20-5-W1.

The housing 20-5 (a molded part) of the socket connector 20 may be formed of a plastic material, for example, a liquid crystal polymer (LCP). Alternatively, the housing 20-5 may be formed of an insulator, such as a resin and an epoxy, without being limited thereto. The power terminal 20-1 and the signal terminal 20-3 of the socket connector 20 may be formed of a metal, for example, copper or a copper alloy plated with gold (a nickel underlayer), without being limited thereto.

Referring to FIG. 3, an inner protruding wall 20-5-P1 is formed between a power terminal 20-1 on the left side of the drawing and three signal terminals 20-3. The inner protruding wall 20-5-P1 is a portion of the housing 20-5 and protrudes upwards from the base 20-5-B of the socket connector 20.

The inner protruding wall 20-5-P1 may also be considered as a low wall between the second wall 20-5-W2 and the fourth wall 20-5-W4. The inner protruding wall 20-5-P1 may be formed between the second wall 20-5-W2 and the fourth wall 20-5-W4 to be closer to the first wall 20-5-W1 than to the third wall 20-5-W3 or closer to the third wall 20-5-W3 than to the first wall 20-5-W1. In FIG. 3, the inner protruding wall 20-5-P1 is closer to the first wall 20-5-W1 than to the third wall 20-5-W3.

As shown in FIG. 3, the inner protruding wall 20-5-P1 has a central portion smaller in height than the second wall 20-5-W2 and the fourth wall 20-5-W4 and an outer portion (in a transverse direction of the connector 20) greater in height than the second wall 20-5-W2 and the fourth wall 20-5-W4. In particular, the outer portion of the inner protruding wall 20-5-P1, which is connected to the central portion of the inner protruding wall 20-5-P1 and protrudes towards both inner surfaces of the wall of the socket connector 20, is referred to as an upward protrusion 20-5-P2.

Since the central portion of the inner protruding wall 20-5-P1 is located below the surrounding walls 20-5-W2, 20-5-W4 (and the upward protrusion 20-5-P2), a spaced is formed above the central portion of the inner protruding wall 20-5-P1. This space is referred to an open hole 20-5-D.

The inner protruding wall 20-5-P1 of the socket connector 20 (put differently, the open hole 20-5-D around the inner protruding wall 20-5-P1) is placed in the space provided by the connection wall 10-5-CW described in FIG. 1 and FIG. 2, which is smaller in width and height than the wall 10-5-W therearound.

In addition, a fastening groove 20-5-MD is formed at a portion of the housing closer to the first wall 20-5-W1 than the inner protruding wall 20-5-P1. The fastening wall 10-5-MW of the plug connector 10 (see FIG. 1 and FIG. 2), which has the same (or substantially the same) height as the wall 10-5-W therearound and a greater width than the wall 10-5-W therearound, is placed in the space provided by the fastening groove 20-5-MD.

In this way, it is possible to prevent reverse mating (fitting in the reverse direction) while significantly reducing the overall height and width of the connectors 10, 20. That is, due to the connection structure between the connection wall 10-5-CW and the open hole 20-5-D, the connection structure between the fastening wall 10-5-MW and the fastening groove 20-5-MD, and the connection structure between the upward protrusion 20-5-P2 and the through-hole 10-5-PH, fitting in the reverse direction (that is, fitting between the connectors 10, 20 with one of the connectors 10, 20 reversed in position in the longitudinal direction thereof) can be prevented. Consequently, it is possible to prevent reverse mating while providing space savings due to reduction in height of the connectors 10, 20.

Referring to FIG. 1, the space provided by the connection wall 10-5-CW is open in the transverse direction of the connector 10 and, referring to FIG. 3, the space provided by the inner protruding wall 20-5-P1 (that is, the open hole 20-5-D) is open in the longitudinal direction of the connector 20. As such, since the transverse opening and the longitudinal opening meet each other, it is possible to ensure the connectors 10, 20 are fitted into (mated with) each other in the correct direction while securing coupling force therebetween.

In addition, since the fastening wall 10-5-MW, which extends beyond both lateral ends of the wall 10-5-W in the transverse direction thereof, is connected to the fastening groove 20-5-MD, which is wide in the transverse direction thereof, it is possible to further ensure that the connectors 10, 20 are fitted into (mated with) each other in the correct direction while securing coupling force therebetween.

If each of the signal terminals 10-3, 20-3 (that is, each pin) has a different role, reverse mating means occurrence of unwanted short-circuit. The same is true for the power terminals 10-1, 20-1. That is, reverse mating can result in unwanted false signal input or unwanted short-circuit depending on the role of each pin. In addition, reverse mating can cause damage to the connector, although, in the case of a connector having a completely symmetrical shape, reverse mating does not cause physical damage to the connector. According to the present invention, it is to fundamentally prevent reverse mating between the connectors 10, 20.

Although FIG. 3 shows the inner protruding wall 20-5-P1, the upward protrusion 20-5-P2, and the fastening groove 20-5-MD, this is merely an example and the housing 20-5 does not necessarily have all these three features. For example, the housing 20-5 may have only the fastening groove 20-5-MD without the inner protruding wall 20-5-P1 and/or the upward protrusion 20-5-P2.

Figure 4:
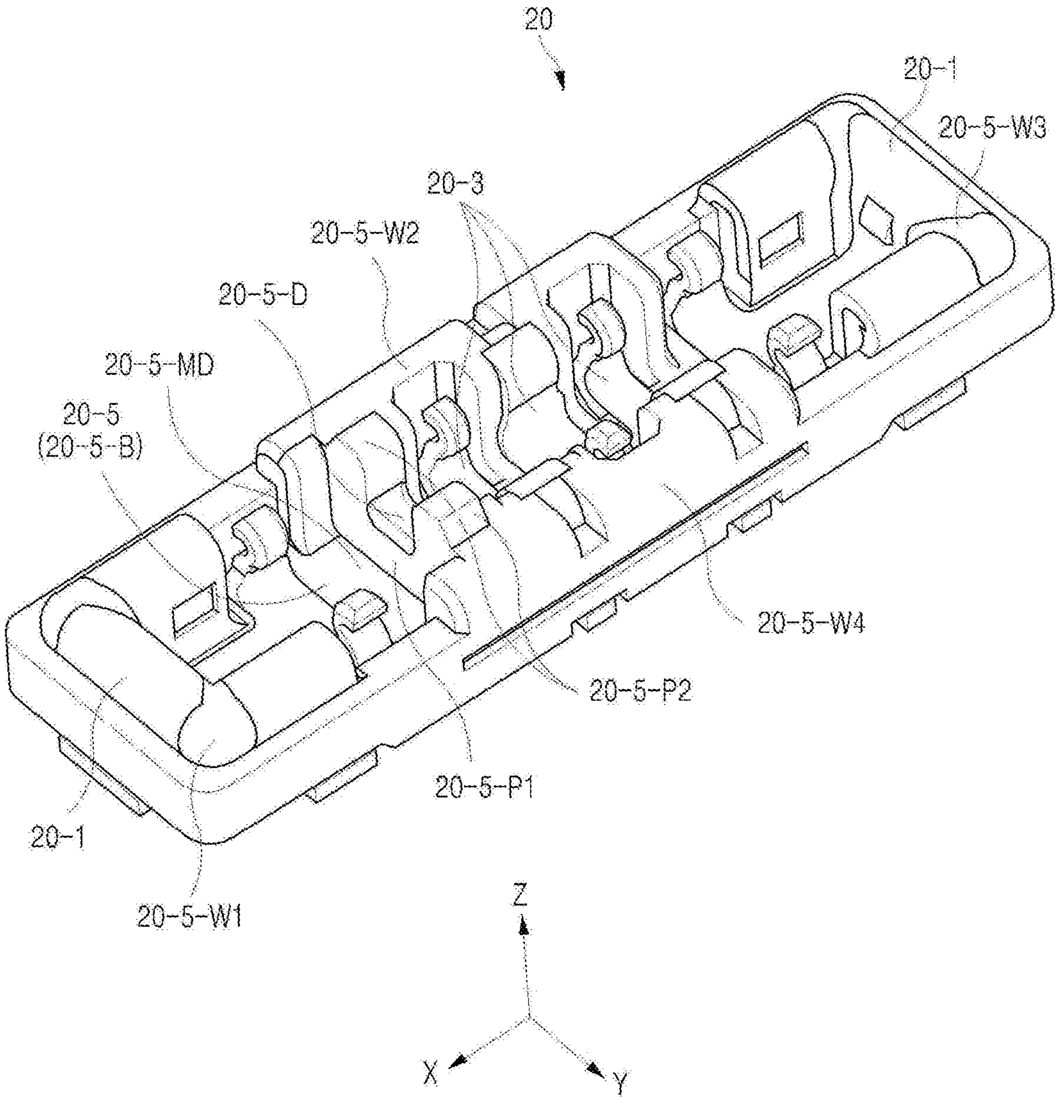
FIG. 4 is a view of the socket connector 20 of FIG. 3 from a different angle.

FIG. 4 is a view of the socket connector 20 of FIG. 3 from a different angle.

FIG. 4, like FIG. 3, shows a power terminal 20-1, a signal terminal 20-3, and a housing 20-5.

The housing 20-5 has a base 20-5-B, walls 20-5-W1 to 20-5-W4, and an inner protruding wall 20-5-P1.

The inner protruding wall 20-5-P1 has a central portion smaller in height than the walls and an outer portion (in the transverse direction of the connector 10) adjoining the second wall 20-5-W2 and the fourth wall 20-5-W4, wherein the outer portion has a greater height than regions of the second wall 20-5-W2 and the fourth wall 20-5-W4, in which the signal terminal 20-3 is disposed, to form an upward protrusion 20-5-P2.

Upon fitting of the plug connector 10 into the socket connector 20, the inner protruding wall 20-5-P1 of the socket connector 20 (put differently, the open hole 20-5-D around the inner protruding wall 20-5-P1) is placed in the space provided by the connection wall 10-5-CW (which is smaller in height and width than the wall 10-5-W therearound) described in FIG. 1 and FIG. 2.

Since each of the connectors 10, 20 has an asymmetrical shape in the longitudinal direction thereof (that is, the connection wall 10-5-CW is formed only on one side in the longitudinal direction of the connector 10 and the inner protruding wall 20-5-P1 is formed only on one side in the longitudinal direction of the connector 20), it is possible to easily know a direction in which the connector 10 is connected to the connector 20 and to instantly recognize misassembly (incorrect fitting), thereby preventing reverse mating.

In addition, since the fastening wall 10-5-MW, which extends beyond both lateral ends of the wall 10-5-W in the transverse direction thereof, is connected to the fastening groove 20-5-MD, which is wide in the transverse direction thereof, it is possible to further ensure that the connectors 10, 20 are fitted into (mated with) each other in the correct direction while securing coupling force therebetween.

Figure 5:
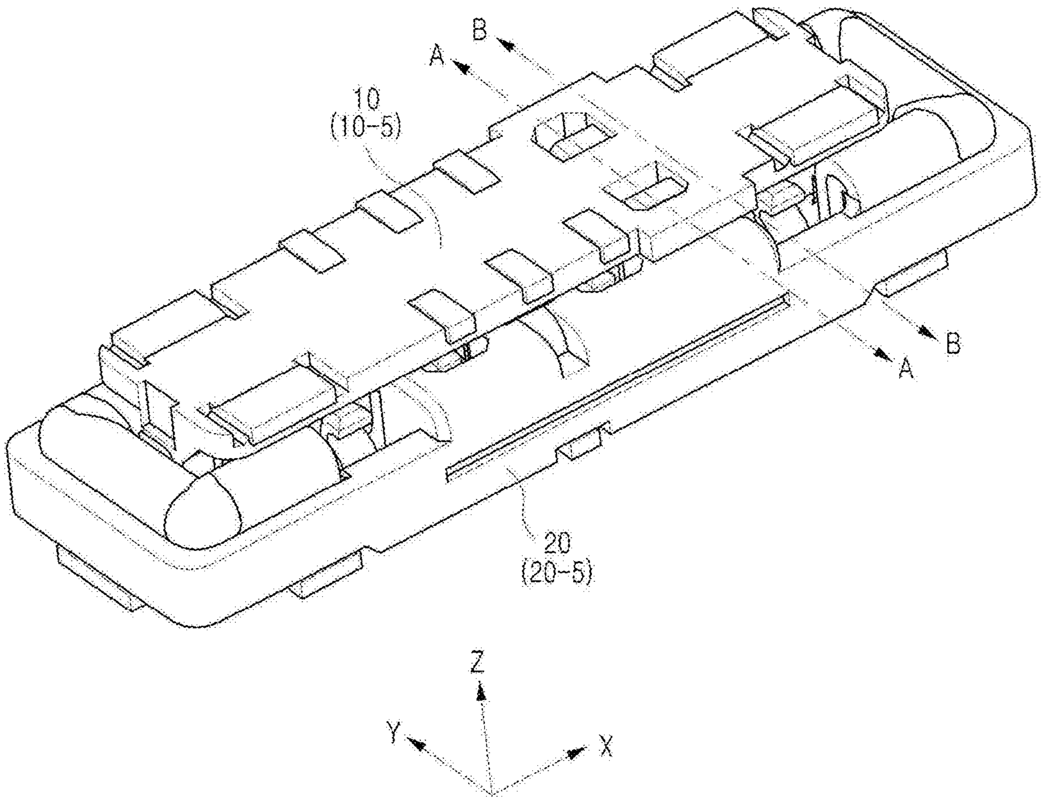
FIG. 5 is a view of the plug connector 10 connected to the socket connector 20.

FIG. 5 is a view of the plug connector 10 connected to the socket connector 20.

The coordinate system of FIG. 5 is matched with those of FIG. 3 to FIG. 4 (showing the socket connector 20). Accordingly, it will be understood that the socket connector 20 of FIG. 3 and FIG. 4 is connected to the plug connector 10 turned upside-down with respect to the position shown in FIG. 1 and FIG. 2.

Referring to FIG. 5, the connection wall 10-5-CW of the plug connector 10 is located on the right side of the drawing and the inner protruding wall 20-5-P1 of the socket connector 20 is also located on the right side of the drawing.

Accordingly, the plug connector 10 can be properly connected to (fitted into) the socket connector 20 in a tight manner, as shown in FIG. 5.

If the plug connector 10 is reversed in position in the X-axis direction (the longitudinal direction of the connector 10) while leaving the socket connector 20 in the position shown in FIG. 5, the plug connector 10 cannot be properly connected to the socket connector 20 since the connection wall 10-5-CW of the plug connector 10 is located on the left side of the drawing and the inner protruding wall 20-5-P1 of the socket connector 20 is located on the right side of the drawing.

With this structure, the inner protruding wall 20-5-P1 of the socket connector 20 (put differently, the open hole 20-5-D around the inner protruding wall 20-5-P1) is placed in the space provided by the connection wall 10-5-CW of the plug connector, which is smaller in height and width than the wall 10-5-W therearound, thereby preventing reverse mating.

In addition, since the fastening wall 10-5-MW, which extends beyond both lateral ends of the wall 10-5-W in the transverse direction thereof, is connected to the fastening groove 20-5-MD, which is wide in the transverse direction thereof, it is possible to further ensure that the connectors 10, 20 are fitted into (mated with) each other in the correct direction while securing coupling force therebetween.

Further, referring to FIG. 5, the upward protrusion 20-5-P2 of the socket connector 20 is exposed through the through-hole 10-5-PH of the plug connector 10, which provides a means to determine proper coupling between the connectors 10, 20 with the naked eye (or using inspection equipment) while providing some coupling force.

Figure 6:
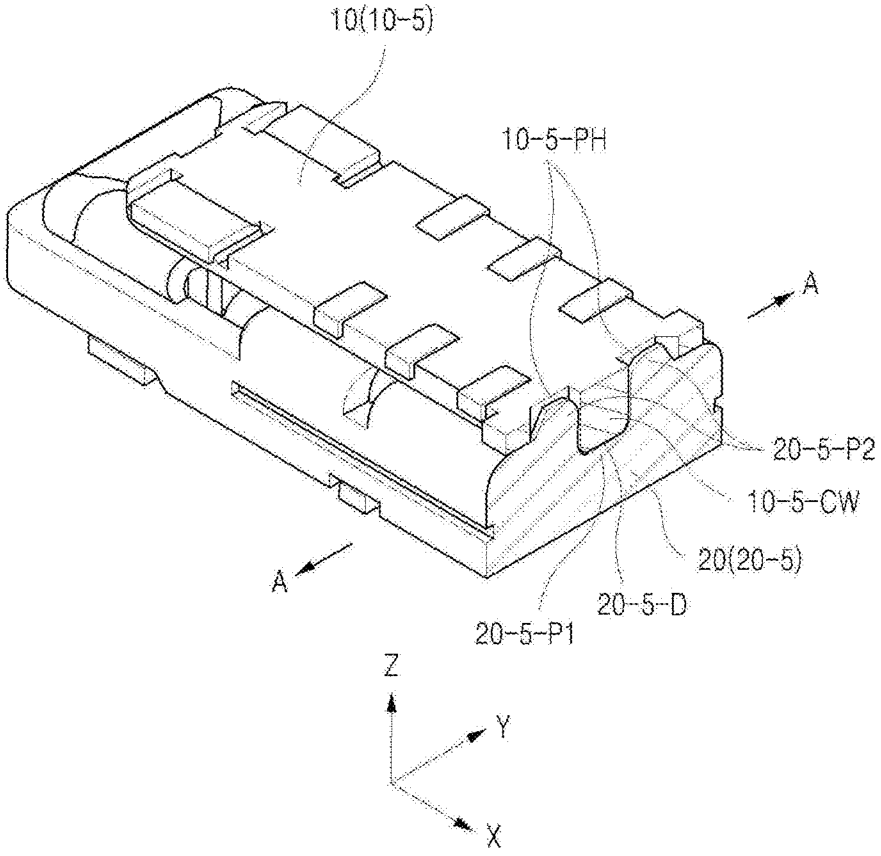
FIG. 6 is a cross-sectional view taken along line A-A of FIG. 5.

FIG. 6 is a cross-sectional view taken along line A-A of FIG. 5.

Referring to FIG. 6, the connection wall 10-5-CW of the plug connector 10 is connected to the open hole 20-5-D formed above the inner protruding wall 20-5-P1 of the socket connector 20.

In addition, the upward protrusion 20-5-P2 corresponding to an outer portion of the inner protruding wall 20-5-P1 of the socket connector 20 is exposed through the through-hole 10-5-PH of the plug connector 10 while being somewhat connected to the through-hole 10-5-PH.

If the plug connector 10 is reversed in position in the X-axis direction (the longitudinal direction of the connector 10) while leaving the socket connector 20 in the position shown in FIG. 6, the plug connector 10 cannot be properly connected to the socket connector 20 since the locations of the connection wall 10-5-CW and the open hole 20-5-D of the plug connector 10 are not matched with each other and the locations of the upward protrusion 20-5-P2 and the through-hole 10-5-PH are not matched with each other.

Figure 7:
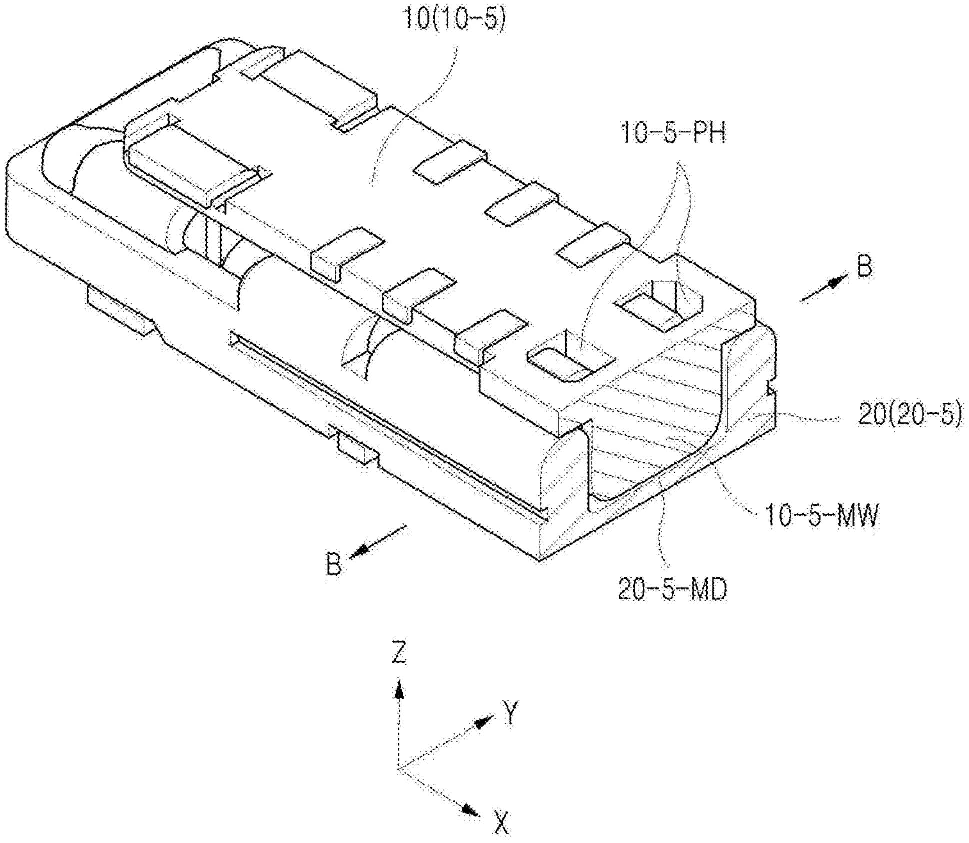
FIG. 7 is a cross-sectional view taken along line B-B of FIG. 5.

FIG. 7 is a cross-sectional view taken along line B-B of FIG. 5.

The cross-section of FIG. 7 is slightly closer to the first wall 20-5-W1 than the cross-section of FIG. 6.

Referring to FIG. 7, the fastening wall 10-5-MW of the plug connector 10 is connected to the fastening groove 20-5-MD of the socket connector 20.

If the plug connector 10 is reversed in position in the X-axis direction (the longitudinal direction of the connector 10) while leaving the socket connector 20 in the position shown in FIG. 7, the plug connector 10 cannot be properly connected to the socket connector 20 since the locations of the fastening wall 10-5-MW and the fastening groove 20-5-MD of the plug connector 10 are not matched with each other.

Figure 8A:
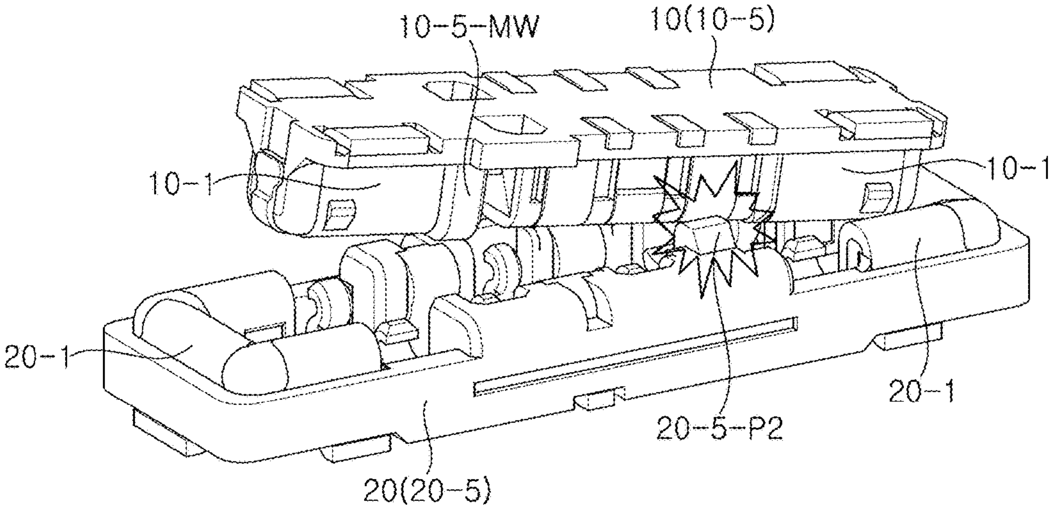
FIG. 8A is an exemplary view of a mechanism for prevention of reverse mating between a pair of connectors according to the present invention.

FIG. 8A is an exemplary view of a mechanism for prevention of reverse mating between a pair of connectors according to the present invention.

Referring to FIG. 8A, the plug connector 10 has a fastening wall 10-5-MW extending beyond both lateral ends of the wall of the plug connector, and the receptacle connector 20 has an upward protrusion 20-5-P2 extending beyond an upper end of the wall of the receptacle connector.

The fastening wall 10-5-MW and the upward protrusion 20-5-P2, which are portions of the housings 10-5, 20-5, are formed of a resin. Accordingly, upon reverse mating as shown in FIG. 8A, the upward protrusion 20-5-P2, which is formed of the resin, is first brought into contact with the mating connector, to prevent two power terminals 10-1 of the connector 10 from being simultaneously brought into contact with two power terminals 20-1 of the connector 20, thereby preventing short-circuit.

Specifically, referring to FIG. 8A, when a portion of the plug connector 10 on the right side of the drawing is pressed downwards with the upward protrusion 20-5-P2 on the right side of the drawing contacting the plug connector 10, a power terminal 10-1 on the right side of the drawing is brought into contact with a power terminal 20-1 on the right side of the drawing, whereas a power terminal 10-1 on the left side of the drawing is not brought into contact with a power terminal 20-1 on the left side of the drawing due to the presence of the upward protrusion 20-5-P2.

Figure 8B:
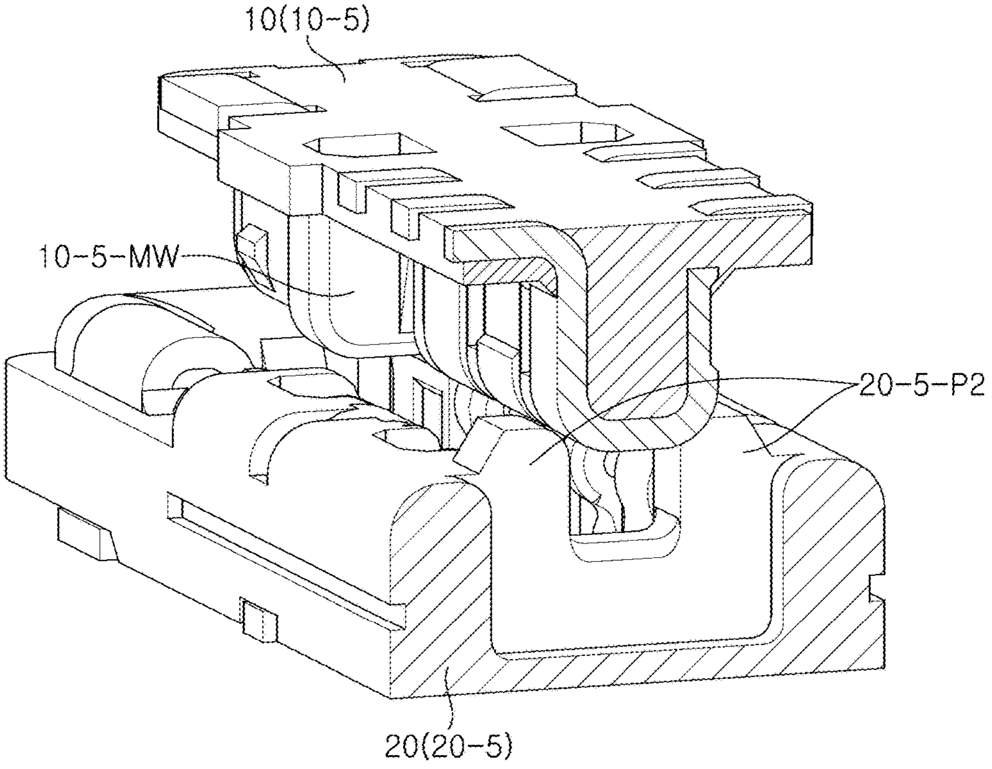
FIG. 8B is a view of the mechanism shown in FIG. 8A taken from a different angle along a cross-section of the upward protrusion (20-5-P2)

FIG. 8B is a view of the mechanism shown in FIG. 8A taken from a different angle along a cross-section of the upward protrusion 20-5-P2.

Referring to FIG. 8B, the upward protrusion 20-5-P2 is brought into contact with a signal terminal 10-3 of the mating connector 10, whereas the power terminal 10-1 on the left side of the drawing is not brought into contact with the power terminal 20-1 on the left side of the drawing. In other words, with the power terminal 10-1 on the right side of the drawing contacting the power terminal 20-1 on the right side of the drawing, the power terminal 10-1 on the left side of the drawing cannot be brought into contact with the power terminal 20-1 on the left side of the drawing due to the presence of the upward protrusion 20-5-P2.

Figure 9A:
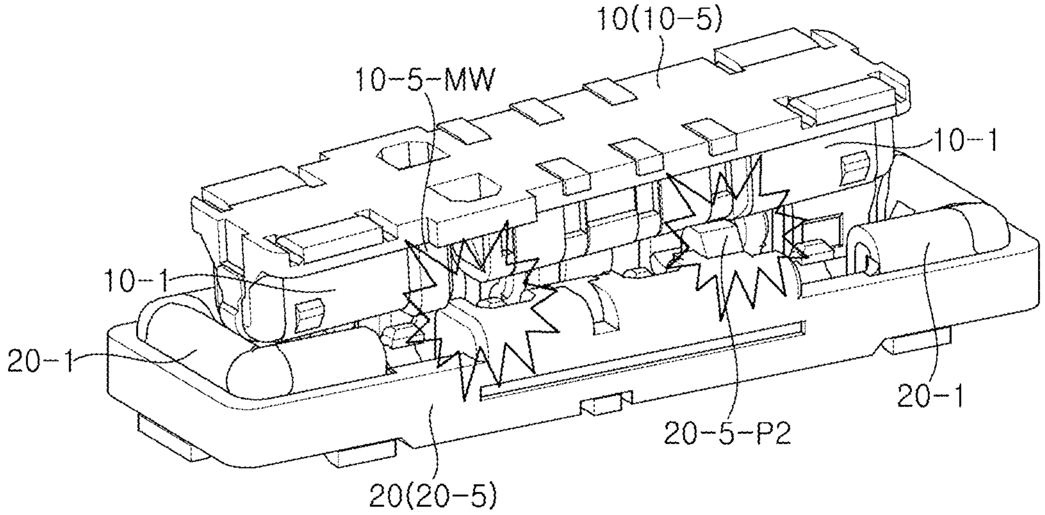
FIG. 9A is another exemplary view of a mechanism for prevention of reverse mating between a pair of connectors according to the present invention.

FIG. 9A is another exemplary view of a mechanism for prevention of reverse mating between a pair of connectors according to the present invention.

Referring to FIG. 9A, the plug connector 10 has a fastening wall 10-5-MW extending beyond both lateral ends of the wall of the plug connector, and the receptacle connector 20 has an upward protrusion 20-5-P2 extending beyond the upper end of the wall of the receptacle connector.

In FIG. 8A, the power terminal 10-1 on the right side of the drawing is brought into contact with the power terminal 20-1 on the right side of the drawing since a portion of the plug connector 10 on the right side of the drawing is first connected to the receptacle connector 20. When additional force is applied to the plug connector 10 in the position shown in FIG. 8A to bring the power terminal 10-1 on the left side of the drawing into contact with the power terminal 20-1 on the left side of the drawing (that is, when a portion of the plug connector 10 on the left side of the drawing is further pressed downwards), the plug connector 10 is moved to the position shown in FIG. 9A.

The fastening wall 10-5-MW and the upward protrusion 20-5-P2, which are portions of the housings 10-5, 20-5, are formed of a resin. Accordingly, upon reverse mating as shown in FIG. 9A, the upward protrusion 20-5-P2 and the fastening wall 10-5-MW, which are formed of the resin, are first brought into contact with the connectors 10, 20, respectively, to prevent two power terminals 10-1 of the connector 10 from being simultaneously brought into contact with two power terminals 20-1 of the connector 20, thereby preventing short-circuit.

Specifically, when the power terminal 10-1 on the right side of the drawing and the power terminal 20-1 are in contact as shown in FIG. 8A and the plug connector 10 is pressed downward on the left side of the drawing, the plug connector 10 is moved to the position shown in FIG. 9A.

In FIG. 9A, the upward protrusion 20-5-P2 on the right side of the drawing is brought into contact with the plug connector 10, like in FIG. 8A, whereas the power terminal 10-1 on the right side of the drawing is moved out of contact with the power terminal 20-1 on the right side of the drawing, unlike in FIG. 8A, due to additional downward force applied to the portion of the plug connector 10 on the right side of the drawing, and the power terminal 10-1 on the left side of the drawing is brought into contact with the power terminal 20-1 on the left side of the drawing due to the presence of the fastening wall 10-5-MW and the upward protrusion 20-5-P2 (More strictly, the power terminal 10-1 is not necessarily brought into contact with the power terminal 20-1 and may be moved to a position in which the power terminal 10-1 is possibly brought into contact with the power terminal 20-1 depending on the shape of the connector).

That is, when the plug connector 10 is in the position shown in FIG. 8A, the power terminal 10-1 and the power terminal 20-1 on the left side of the drawing do not contact each other, whereas, when the plug connector 10 is in the position shown in FIG. 9A, the power terminal 10-1 and the power terminal 20-1 on the right side of the drawing do not contact each other. If the portion of the plug connector 10 on the left side of the drawing, instead of the portion of the connector 10 on the right side of the drawing, is first pressed downwards, the result is the same.

In other words, although the power terminal 10-1 and the power terminal 20-1 on the left side of the drawing can be brought into contact with each other and the power terminal 10-1 and the power terminal 20-1 on the right side of the drawing can be brought into contact with each other, there is no case in which the two power terminals 10-1 on the left side of the drawing are simultaneously brought into contact with the two power terminals 20-1 on the left side of the drawing, respectively.

As a result, the two power terminals of the connector 10 can be prevented from being brought into contact with the two power terminals of the connector 20 at the same time, thereby preventing short-circuit.

Figure 9B:
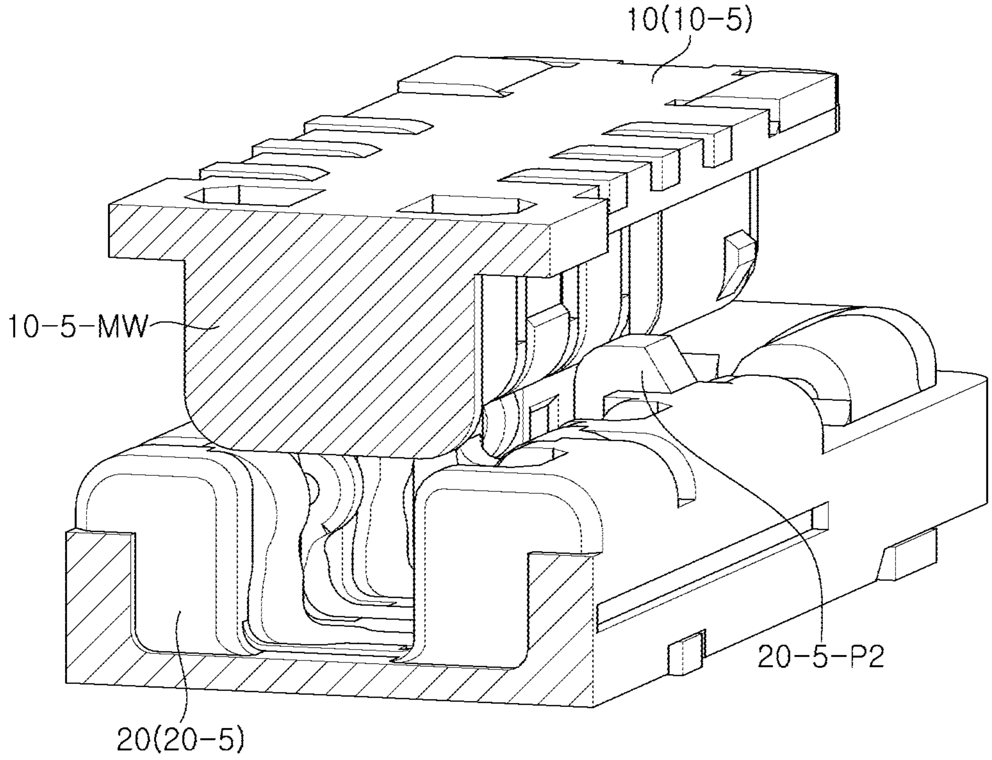
FIG. 9B is a view of the mechanism shown in FIG. 9A taken from a different angle along a cross-section of the fastening wall (10-5-MW).

FIG. 9B is a view of the mechanism shown in FIG. 9A taken from a different angle along a cross-section of the fastening wall 10-5-MW.

Referring to FIG. 9B, the fastening wall 10-5-MW is brought into contact with the signal terminal 10-3 or the walls 20-5-W2, 20-5-W4 of the mating connector 20, whereas the power terminal 10-1 on the right side of the drawing is not brought into contact with the power terminal 20-1 on the right side of the drawing. That is, with the power terminal 10-1 on the left side of the drawing contacting the power terminal 20-1 on the left side of the drawing, the power terminal 10-1 on the right side of the drawing cannot be brought into contact with the power terminal 20-1 on the right side of the drawing due to the presence of the fastening wall 10-5-MW and the upward protrusion 20-5-P2.

Although some embodiments have been described herein in conjunction with the accompanying drawings, it should be understood that the present invention is not limited to the embodiments and may be embodied in different ways, and that various modifications, changes, alterations, and equivalent embodiments can be made by those skilled in the art without departing from the spirit and scope of the invention. Therefore, it should be understood that the foregoing embodiments are provided for illustration only and are not to be in any way construed as limiting the present invention.

LIST OF REFERENCE NUMBERALS

10: Plug connector
10-1: (Plug) power terminal
10-3: (Plug) signal terminal
10-5: (Plug) housing (molded part)
10-5-B: Base
10-5-W: Wall
10-5-CW: Connection wall
10-5-I: Inclined portion (inclined plane)
10-5-MW: Fastening wall
10-5-PH: Through-hole
20: Receptacle connector (socket connector)
20-1: (Receptacle) power terminal
20-3: (Receptacle) signal terminal
20-5: (Receptacle) housing (molded part)
20-5-W1: First wall
20-5-W2: Second wall
20-5-W3: Third wall
20-5-W4: Fourth wall
20-5-P1: Inner protruding wall
20-5-D: Open hole
20-5-P2: Upward protrusion
20-5-MD: Fastening groove

The invention claimed is:

1. A pair of electrical connectors comprising a plug connector and a receptacle connector,
wherein the plug connector comprises:
(a) a plug housing comprising a plug base and a wall protruding upwards from the plug base;
(b) a plug signal terminal disposed on the wall;
(c) a plug power terminal disposed on the wall;
(d) a fastening wall formed on the wall between the plug signal terminal and the plug power terminal;
(e) a connection wall between the fastening wall and the wall of the plug connector, the connection wall being smaller in height and width than the wall of the plug connector; and
(f) a through-hole formed through the plug housing at both sides of the connection wall;
the receptacle connector comprises;
(g) a receptacle housing comprising a receptacle base, a first wall protruding from an upper surface of the receptacle base, a second wall protruding from the upper surface of the receptacle base and crossing the first wall, a third wall protruding from the upper surface of the receptacle base, crossing the second wall, and facing the first wall, and a fourth wall protruding from the upper surface of the receptacle base, crossing the first and third walls, and facing the second wall;
(h) a receptacle signal terminal disposed at least on the second wall;
(i) a receptacle power terminal disposed at least on the first wall; and
(j) a fastening groove formed between the second wall and the fourth wall, and
the fastening wall is placed on the fastening groove with the plug connector completely fitted into the receptacle connector.

2. The pair of electrical connectors according to claim 1, wherein the fastening wall is formed on the wall of the plug connector and has a greater width than the wall.

3. The pair of electrical connectors according to claim 1, wherein the receptacle connector further comprises: an inner protruding wall between the second wall and the fourth wall, the inner protruding wall protruding upwards from the receptacle base and extending toward inner surfaces of the second wall and the fourth wall in a transverse direction of the receptacle connector.

4. The pair of electrical connectors according to claim 3, wherein the inner protruding wall is formed at an upper portion thereof with an upward protrusion extending higher than the wall of the receptacle housing.

5. The pair of electrical connectors according to claim 4, wherein the upward protrusion is placed in the through-hole with the plug connector completely fitted into the receptacle connector.

6. The pair of electrical connectors according to claim 3, wherein a space above the inner protruding wall forms an open hole and the connection wall is placed in the open hole with the plug connector completely fitted into the receptacle connector.

* * * * *